E. FUCHS.
VEHICLE OF THE SELF LAYING TRACK TYPE.
APPLICATION FILED APR. 25, 1918.
1,307,092.
Patented June 17, 1919.
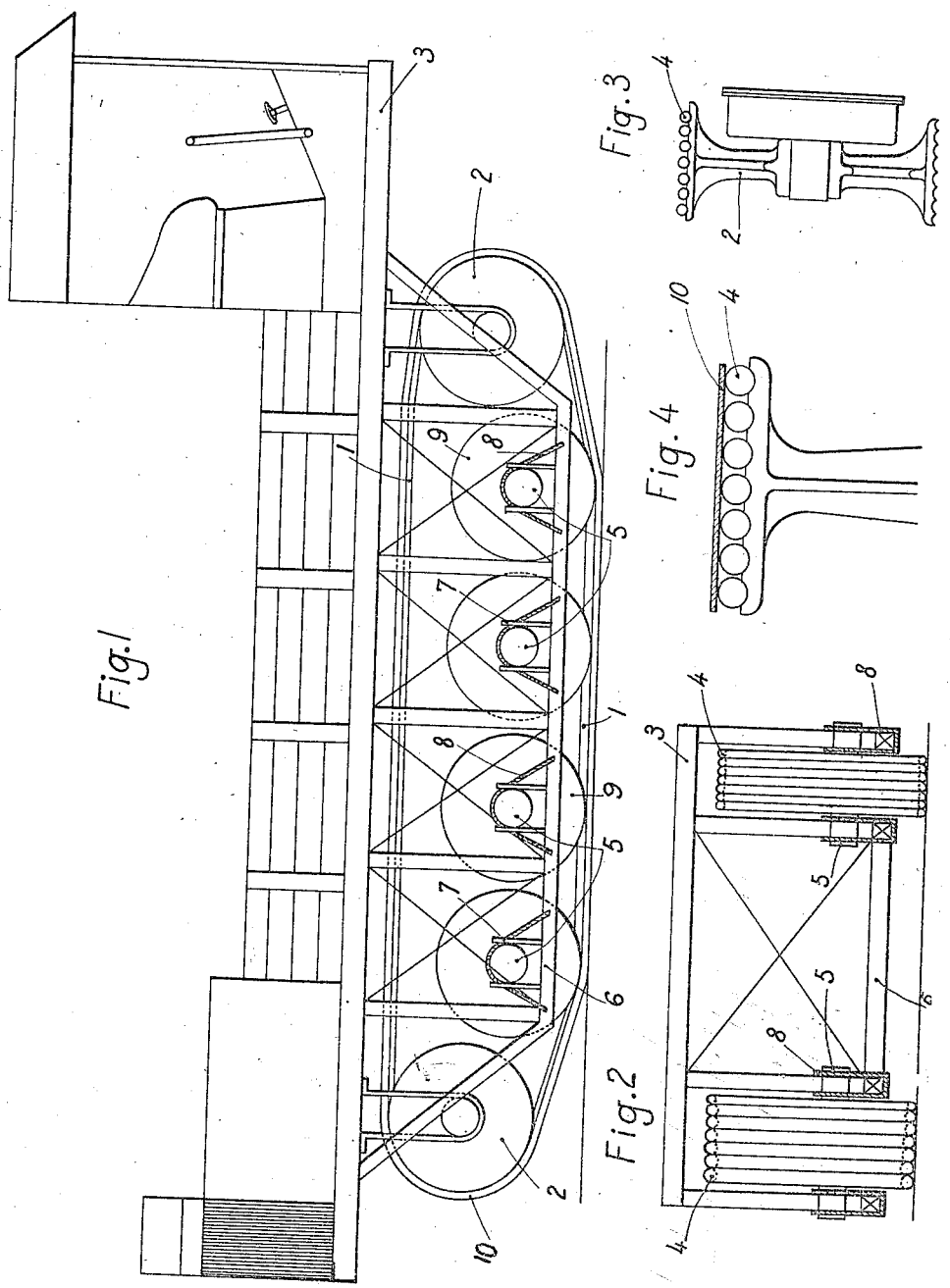

UNITED STATES PATENT OFFICE.

ERNEST FUCHS, OF PARIS, FRANCE, ASSIGNOR TO LOUIS RENAULT, OF BILLANCOURT, FRANCE.

VEHICLE OF THE SELF-LAYING-TRACK TYPE.

1,307,092.

Specification of Letters Patent.

Patented June 17, 1919.

Application filed April 25, 1918. Serial No. 230,820.

*To all whom it may concern:*

Be it known that I, ERNEST FUCHS, engineer, of 111 Boulevard Exelmans, at Paris, Department of the Seine, France, citizen of the French Republic, have invented certain new and useful Improvements Relating to Vehicles of the Self-Laying-Track Type; and I do hereby declare the following to be a full, clear, and exact description of the invention, such as will enable others skilled in the art to which it appertains to make and use the same.

This invention relates to motor driven vehicles of the self-laying track type and has for its object to provide an improved vehicle of this type specially adapted for operating in sandy or marshy country.

With this object in view the invention consists in a vehicle of the above mentioned kind provided with a track consisting of a series of adjacent endless cables made of a deformable material, with or without the addition to the said track of a floating bearing or sole piece.
This kind of deformable track dispenses with the usual joints which are subjected to very rapid wear and it also offers the advantage of a considerably smaller bulk which enables the vehicle to attain much greater speeds than can usually be attained by vehicles of this kind of the heretofore known construction.

In order that the nature of the invention may be clearly understood a constructional embodiment of the same which has given good results in practice will now be described by way of illustration with the aid of the accompanying drawings, in which:

Figure 1 is a view in elevation of the improved vehicle of the self-laying track type:

Fig. 2 is a transverse view showing the endless cables constituting the track upon the carrier wheels.

Fig. 3 shows a non-carrier pulley for the track of the vehicle to which motor driven pulley is attached.

Fig. 4 shows the addition to the endless cables of the track of a sole piece or other supporting arrangement.
Referring to the drawings, each of the two flexible tracks 1 supporting the vehicle is carried by two grooved drums 2 of which at least one is rotated by the motor, for example by means of a pulley as shown in Fig.
3. As these two drums 2 are fixed upon the frame 3 it is essential that they should not be used to support the vehicle upon the ground, the said drums being only used for the purpose of circulating the flexible track
1 which may consist of a series of cables
4 arranged adjacent or juxtaposed relatively to one another and may or may not be independent of one another. The lower portions of this series of cables are in contact with the ground under the action of a series of independent axles 5 each individually capable of making up and down movements relatively to the frame and carrying grooved wheels adapted to receive the cables constituting the flexible track 1. In the preferred form each carrier axle is connected to the frame by an elastic suspension always tending to apply the track upon the ground whatever inequalities of the latter may be encountered.

Figs. 1 and 4 show by way of example and diagrammatically some details of the preferred construction comprising a lower beam 6 of the frame carrying vertical slides 7 in which the axles 5 can move up or down, it being understood however that the axles 5 are continuously urged downward under the action of elastic pressure devices 8 which thus bear upon the corresponding carrier wheels 9 while passing over all the hollows in the ground. The elastic pressure devices 8 may conveniently each consist of a short rubber cable passing over the corresponding axle 5 the ends of the cable being fixed to the lower beam 6 arranged below the normal level of the axles, each device 8 thus exerting a downward pull upon the upper part of the corresponding carrier axle 5.

Each of the flexible endless cables 4, the assemblage of which constitutes a track, may consist of a rubber cord when the power to be transmitted is not too great. For higher powers the cables may be provided with an armored core of hemp, or of steel, or with an interior fitting of canvas.

In some cases when the ground is very soft or marshy the cables forming the tracks may be webbed together by any suitable means thus both increasing the supporting surface and at the same time preventing earth from being squeezed in between the endless cables forming the track; for this purpose a floating bearing or sole piece consisting of a rubber belt or band 10 (Fig. 4), of or plates of metal, wood, rubber, or of any other suitable material, may be arranged over the assemblage constituting the track.

The advantage of a track composed of a cable of several strands is that the adherence of the wheels is thereby considerably increased; in certain cases a multiple strand cable may be replaced by a simple flexible band or belt of any suitable material.

In vehicles operated by two tracks (Fig. 1), the steering of the vehicle is effected by increasing or decreasing the speed of one track relatively to the other.

In view of the suppleness of the flexible track and the ease with which it can be deformed the vehicle can be caused to change its direction by displacing certain of the stretcher or carrier wheels relatively to the others, especially in the case of vehicles which are not required to turn around in restricted spaces. This mode of operating may be carried out by raising the wheel axles so that they slide a short distance in their bearings, the result being that the track will not remain over its whole length parallel to the axis of the frame and hence the latter will take a modified direction.

The flexible track hereinabove described may also be applied to a vehicle provided at its front or rear end with a cylinder or with two steering wheels, as will be readily understood.

I claim:

1. In a vehicle of the self-laying track type, the combination with a pair of spaced drums, of a plurality of wheels located between the same and having vertical movement, said wheels having grooves in their peripheral faces, a plurality of endless cables located in said grooves and passing around the drums, and an endless belt inclosing the cables and mounted to have free movement relatively thereto.

2. In a vehicle of the self-laying track type, the combination with a frame having a pair of spaced drums on the ends thereof, wheels mounted on the frame between the drums for vertical movement, rubber elements tending to maintain the wheels in their lower positions, said wheels having grooves in the peripheral faces thereof, endless cables passing around the drums, over the wheels and located in the grooves thereof, and an endless rubber belt or track passing around the drums and bearing on the outer faces of the cables.

3. In a tractor of the self-laying track type, the combination with a pair of spaced drums, of a plurality of relatively wide wheels disposed between the same and having grooves in the peripheral faces thereof, and endless cables passing around the drums and over the wheels and located in the grooves of the latter.

4. In a tractor of the self-laying track type, the combination with a pair of spaced drums, of a pair of endless traction elements passing around said drums, one of said elements being superimposed on the other and movable relatively thereto.

In testimony whereof I affix my signature, in presence of two witnesses.

ERNEST FUCHS.

Witnesses:
 CHAS. P. PRESSLY,
 A. BERSHOLLE.